US006811898B2

(12) United States Patent
Ohara et al.

(10) Patent No.: US 6,811,898 B2
(45) Date of Patent: Nov. 2, 2004

(54) WEAR-RESISTANT COATING AND METHOD FOR APPLYING IT

(75) Inventors: Minoru Ohara, Hyogo (JP); Masahiko Mega, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/257,957

(22) PCT Filed: Feb. 27, 2002

(86) PCT No.: PCT/JP02/01789

§ 371 (c)(1), (2), (4) Date: Apr. 1, 2003

(87) PCT Pub. No.: WO02/068716

PCT Pub. Date: Sep. 6, 2002

(65) Prior Publication Data

US 2003/0183529 A1 Oct. 2, 2003

(30) Foreign Application Priority Data

Feb. 28, 2001 (JP) ....................................... 2001-053741

(51) Int. Cl.[7] .................................................. B32B 9/00

(52) U.S. Cl. .................... 428/697; 428/472.1; 428/701; 428/702

(58) Field of Search .............................. 428/472.1, 697, 428/701, 702

(56) References Cited

U.S. PATENT DOCUMENTS

| | | | |
|---|---|---|---|
| 5,076,897 | A | 12/1991 | Wride et al. |
| 5,993,976 | A | 11/1999 | Sahoo et al. |
| 6,190,124 | B1 | 2/2001 | Freling et al. |

FOREIGN PATENT DOCUMENTS

| | | |
|---|---|---|
| JP | 2-285078 | 11/1990 |
| JP | 10-030403 | 2/1998 |
| WO | 94/19583 | 9/1994 |

*Primary Examiner*—Cathy Lam
(74) *Attorney, Agent, or Firm*—Oblon, Spivak, McClelland, Maier & Neustadt, P.C.

(57) ABSTRACT

The present invention provides an abrasion-resistant coating which has high oxidation resistance and durability and can be applied easily at a low cost. The abrasion-resistant coating in accordance with the present invention is formed at the tip end of a base material forming a gas turbine blade. The abrasion-resistant coating at the tip end has a thickness of 300 microns. On the tip end, hard particles H consisting of CBN are fixed in a bond coating formed by heating, melting, and solidification of a mixture of a brazing filler metal and M—Cr—Al—Y (M designates a metal element such as Co and Ni). The hard particles H are Ni and Co coated to improve wettability relative to the brazing filler metal, and are arranged so that some of them are partially protruded from the surface of bond coating to exhibit the grindability.

18 Claims, 2 Drawing Sheets

WEAR-RESISTANT COATING AND METHOD FOR APPLYING IT

TECHNICAL FIELD

The present invention relates to an abrasion-resistant coating applied to a metallic base material in a tip-end portion of a blade for a gas turbine, a gas turbine engine, a compressor, and the like, and a method for applying the abrasion-resistant coating.

BACKGROUND ART

A gap between the tip end of a blade for, for example, a gas turbine and a split ring fixed on the inner peripheral surface of a blade housing portion is required to be as small as possible to enhance the gas turbine efficiency by restraining a shortcut of gas to the downstream-side stage.

However, if the gap is too small, at the initial stage of operation start of gas turbine, due to thermal expansion of blade, decentering of rotor, vibrations of the whole of gas turbine, and thermal deformation etc. of the blade ring exposed to high-temperature gas by a long-term operation of gas turbine, the tip-end portion of blade comes into contact with a blade ring, whereby both or either one of blade, especially the tip end thereof is sometimes damaged excessively.

As a countermeasure against this problem, there has been proposed a technology in which an abrasion-resistant coating consisting of a material harder than the material forming the blade ring is applied at the tip end of blade. The aim of this technology is to keep the gap between the blade tip end and the blade ring to a minimum by grinding the surface of blade ring by the coating with the blade itself being scarcely damaged. A part of this technology has already been employed.

For example, Japanese Patent Provisional Publication No. 4-218698 (No. 218698/1992) and Japanese Patent Publication No. 8-506872 (No. 506872/1996) have disclosed an M—Cr—Al—Y (hereinafter referred to as MCrAlY, where M designates a metal element) matrix having a high oxidation resistance at a high temperature used as a bond coating. Also, there has been disclosed an abrasion-resistant coating in which cubic boron nitride (hereinafter referred to as CBN) particles having high hardness and high heat resistance are dispersed in the matrix as abrasive particles, and there has been a description such that the coating is applied by electrodeposition plating. Although this technology is said to have been completed technically, the apparatus and process for applying the coating is complicated, and a long period of time is required to complete the application work, which presents a problem of high cost.

Also, Japanese Patent Provisional Publication No. 11-222661 (No. 222661/1999) and Japanese Patent Provisional Publication No. 11-229810 (No. 229810/1999) have disclosed a bond coating consisting of MCrAlY, which has a high oxidation resistance at a high temperature. Also, there has been disclosed that an abrasion-resistant coating, in which abrasion-resistant layers consisting mainly of zirconia etc., which have high hardness and high heat resistance, are piled directly or via an alumina layer, is applied on the bond coating, and a part of the coating is applied by thermal spraying including plasma spray.

Further, Japanese Patent Provisional Publication No. 10-030403 (No. 030403/1998) has disclosed an abrasion-resistant coating in which alumina particles are fixed by a nickel-plated layer formed on the surface of base material and a nickel-based heat resisting alloy layer. Also, there has been a description such that this coating is applied by plating, thermal spraying, HIP treatment, and other means.

However, the above-described application method includes other coating means such as electrodeposition plating and EB-PVD in addition to thermal spraying, so that the operation is troublesome, and the cost is high. Moreover, it is difficult to control the distribution of hard particles having a high abrasion resistance, for example, because the hard particles are embedded in the bond coating, which presents a problem of poor grindability and insufficient heat resistance.

Besides, INDUSTRIAL DIAMOND REVIEW (4/99) describes an abrasion-resistant coating in which Ti coated CBN is brazed. Although brazing has an advantage of being easy in operation and low in cost, it has disadvantages in terms of oxidation resistance of bond coating formed thereby and long-term abrasion resistance (durability) (for example, CBN is separated due to the deterioration thereof).

DISCLOSURE OF THE INVENTION

The present invention has been achieved in view of the above situation, and accordingly an object thereof is to provide an abrasion-resistant coating which has high oxidation resistance and durability and can be applied easily at a low cost to solve the above problems with the conventional examples, and a method for applying the abrasion-resistant coating.

The abrasion-resistant coating in accordance with the present invention is formed of a bond coating formed on the surface of a metallic base material by melting of a mixture containing a brazing filler metal and MCrAlY and hard particles dispersed in and fixed to the bond coating so that some of them are partially protruded from the surface of the bond coating.

In the present invention, a metal coating for improving wettability relative to the brazing filler metal can preferably be formed on the surface of the hard particle.

Also, the abrasion-resistant coating can be formed of hard particles fixed to a metal plating layer provided on the surface of a metallic base material and a bond coating formed on the surface of the metallic base material by melting of a mixture containing a brazing filler metal and MCrAlY so that some of the hard particles are partially protruded from the surface of the bond coating. Further, a plurality of layers in which a plurality of kinds of hard particles having different hardness and oxidation resistance are dispersed separately can be formed, and further, in each of the layers, a metal plating layer for fixing hard particles dispersed in that layer can be formed between the layers. Also, the method for applying the abrasion-resistant coating in accordance with the present invention includes a step of applying a liquid substance containing metal coated hard particles, a brazing filler metal, MCrAlY, and a liquid binder which evaporates at the time of heating to the surface of a metallic base material and a step of heating the applied liquid substance locally to a brazing temperature under high vacuum to evaporate the binder and to melt the brazing filler metal and MCrAlY. Further, the method for applying the abrasion-resistant coating in accordance with the present invention includes a step of affixing a sheet consisting of a plastic mixture containing a brazing filler metal, MCrAlY, and a binder which evaporates at the time of heating to the surface of a metallic base material, a step of applying a liquid mixture consisting of hard particles H and the binder to the affixed sheet, and a step of heating the affixed sheet and applied liquid mixture locally to a brazing temperature under high vacuum to evaporate the binder and to melt the brazing filler metal and MCrAlY.

The method for applying the abrasion-resistant coating in accordance with the present invention includes a step of forming a metal plating layer on a metallic base material and temporarily fixing hard particles to the plating layer, a step of pouring a liquid mixture containing a brazing filler metal, MCrAlY, and a liquid binder which evaporates at the time of heating onto the metal plating layer, and a step of heating the poured liquid mixture locally to a brazing temperature under high vacuum to evaporate the binder and to melt the brazing filler metal and MCrAlY.

In these inventions, a plurality of coating layers in which a plurality of kinds of hard particles having different hardness and oxidation resistance are dispersed separately can be formed successively, and further in each layer of the plural coating layers, a metal plating layer for fixing the hard particles dispersed in the layer can be formed.

BEST MODE FOR CARRYING OUT THE INVENTION

A first embodiment of an abrasion-resistant coating in accordance with the present invention will now be described with reference to the accompanying drawing.

Figure 1:
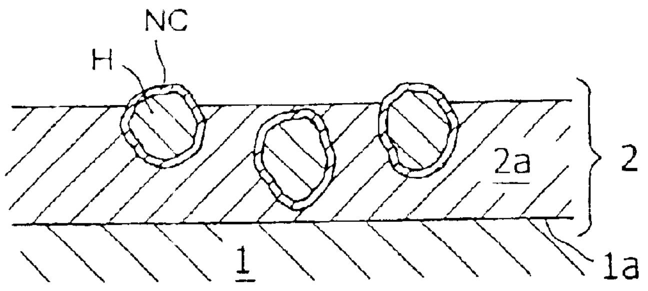
FIG. 1 is a sectional view of a base material and a coating layer showing a first embodiment of an abrasion-resistant coating and a method for applying the abrasion-resistant coating in accordance with the present invention.

As shown in FIG. 1, this abrasion-resistant coating is formed at a tip end 1*a* of a base material 1 constituting a gas turbine blade, and at the upper part (longitudinal direction) on the paper surface, a blade ring, for example, faces the abrasion-resistant coating with a very narrow gap being provided therebetween. An abrasion-resistant coating 2 at the tip end 1*a* has a thickness of, for example, 300 microns, and is formed as described below.

On the tip end 1*a* of the base material 1, hard particles H consisting of CBN are fixed in a bond coating 2*a* formed by heating, melting, and solidification of a mixture of a brazing filler metal and MCrAlY (M designates a metal element such as Co and Ni). The mixing ratio of brazing filler metal, MCrAlY and CBN is about 60%:10%:30% (vol %).

The hard particles H have a Ni and Co coating NC to improve wettability relative to the brazing filler metal, and it is preferable that some of the hard particles H be arranged so as to partially protrude from the surface of the bond coating 2*a* to exhibit grindability.

The following is a further detailed description of the components. As the hard particle H, in addition to CBN, $Al_2O_3$ and SiC can be used. These components may be used singly or may be used in a state in which two or three kinds of these components are mixed at an appropriate ratio. Some kinds of hard particles H having the Ni and Co coating NC are commercially available, and such commercially available hard particles can be used as they are. Also, as described above, M in MCrAlY designates Co, Ni, and the like. In this embodiment, as a brazing filler metal, Ni-based metal represented by BNi-2 (JIS) is used, but the brazing is not limited to nickel brazing.

The abrasion-resistant coating 2 is formed as described below.

First, a liquid substance in which the hard particles H having the Ni coating NC, the brazing filler metal, MCrAlY, and a liquid binder, which evaporates at the time of heating, are blended is applied to the tip end 1*a* of the base material 1 with a brush or the like.

Next, the applied liquid substance is heated locally to a brazing temperature by high frequency induction heating under high vacuum. Thereby, the binder is evaporated, and the brazing filler metal and MCrAlY are melted. Since the hard particles H having small specific gravity float on the surface of the melt, it is necessary to push the hard particles H with a plate-like tool to a degree such that some of the hard particles H protrude partially from the surface of the melt. When the heating is stopped and cooling is performed, the material solidifies, and thus the coating 2 is formed at the tip end of the base material 1. Finally, heating treatment is accomplished for the diffusion between the brazing filler metal, MCrAlY, and the Ni coating NC. Thereby, firm bonding due to mutual diffusion takes place, and hence the abrasion-resistant coating 2 having a high oxidation resistance is formed.

Next, the operation of this embodiment will be described.

The equipment for applying the above-described abrasion-resistant coating 2 is easy to operate, and the applied raw materials are used effectively for the formation of the coating 2. Therefore, for the abrasion-resistant coating 2, the quantities of necessary raw materials are small, time for completion of work except heating for diffusion treatment is short, and the work for forming the abrasion-resistant coating 2 can be performed at a low cost.

Moreover, at the early stage of operation at which heavy friction with the blade ring is expected, a protruding portion of the hard particle H protruding from the surface of the bond coating 2*a* functions as an abrasive material, and the blade ring having low hardness is ground. Also, in the subsequent long-term operation, the bond coating 2*a* exposed to a high-temperature gas is deteriorated by the oxidation from the surface, and accordingly the hard particles H dispersed at positions near the surface may come off. In this state, when the abrasion-resistant coating 2 comes into contact with the blade ring due to the thermal deformation of blade ring or other causes, the hard particles H remaining in the bond coating 2*a* function as an abrasive material. Therefore, the blade is not damaged for a long period of time. Moreover, the gap between the blade tip end and the blade ring is kept at a minimum, so that the gas turbine efficiency can be kept at a high level for a long period of time.

In the brazing method, it has been confirmed that unlike the plating method, hard particles tend to be embedded in a metal layer after the coating is applied, and thus sufficient cutting ability cannot be ensured if no further treatment is accomplished. Therefore, some means for protruding the embedded abrasive particles were studied. As a result, it has been confirmed that protruding (putting out) of abrasive particles performed by microblasting after the application of coating is the most effective method for developing cutting ability.

Specifically, in the case where the abrasive particle density is about 50 particles per square millimeters, the following conditions were suitable for protruding depending on the kind of hard abrasive particle. In the case where the density is further higher than the above-described value, it is necessary to further decrease the grain size of blasting material.

In the case where protruding is performed by electric discharge machining, if weak electric discharge machining is performed on the coating surface, the metallic layer is selectively removed. Also, since electric discharge does not take place on the particles (CBN etc.), the particles remain soundly.

The following is a description of specific examples in the case where CBN or $Al_2O_3$ is used as an abrasive particle.

(1) In the Case Where Abrasive Particle is CBN

Since the metallic layer has a hardness of about Hv300 at ordinary temperature, and CBN has a hardness of about Hv5000 at ordinary temperature, as a blast material having a medium hardness, $Al_2O_3$ abrasive grains (Hv2000, ordinary temperature) were selected to perform protruding.

| | |
|---|---|
| Blast material | $Al_2O_3$ abrasive grains (50 $\mu$m) |
| Blasting pressure | 4 to 5 kg/cm$^2$ |
| Blasting distance | about 20 mm |
| Blasting time | 10 to 20 seconds |

As the result that the abrasive grains were embedded in the coating layer under the above-described conditions, sufficient cutting ability was obtained.

(2) In the Case Where Abrasive Particle is $Al_2O_3$

Since the metallic layer has a hardness of about Hv300 at ordinary temperature, and $Al_2O_3$ has a hardness of about Hv2000 at ordinary temperature, as a blast material having a medium hardness, $ZrO_2$ abrasive grains (Hv1000) were selected to perform sprouting.

| | |
|---|---|
| Blast material | $ZrO_2$ abrasive grains (50 $\mu$m) |
| Blasting pressure | 5 to 6 kg/cm$^2$ |
| Blasting distance | about 20 mm |
| Blasting time | 60 to 100 seconds |

As the result that the abrasive grains were embedded in the coating layer under the above-described conditions, sufficient cutting ability was obtained.

Figure 2:
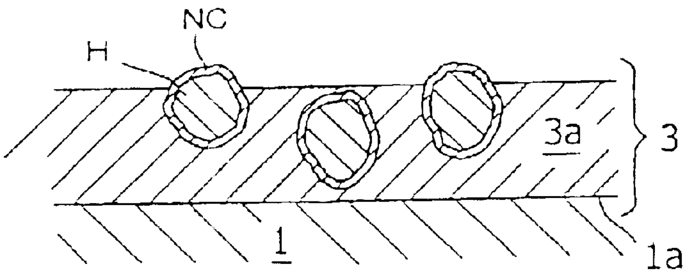
FIG. 2 is a sectional view of a base material and a coating layer showing a second embodiment of an abrasion-resistant coating and a method for applying the abrasion-resistant coating in accordance with the present invention.

A second embodiment of the present invention will be described with reference to FIG. 2.

As a brazing filler metal, a metal obtained by adding an appropriate percentage of Cr, Al, Y, Ta, W, etc. to the Ni-based metal representing Ni brazing, which is used in the first embodiment, is used. Thereby, the addition percentage of MCrAlY is reduced.

The following is a description of the method for forming the abrasion-resistant coating. Firstly, a sheet is prepared from a plastic mixture in which the brazing filler metal, MCrAlY, and a binder of a smaller amount than that of the binder used in the first embodiment are blended. Secondly, the sheet is affixed to the tip end 1*a* of the base material 1 by spot welding. Thirdly, a liquid mixture of the hard particles H and the binder is applied on the sheet with a brush or the like.

The subsequent procedure is almost the same as that of the first embodiment. When the sheet is heated locally to a brazing temperature by high frequency induction heating under high vacuum, the binder is evaporated, and the sheet-shaped brazing filler metal and MCrAlY are melted and integrated. When the heating is stopped and cooling is performed, the material solidifies, and thus a bond coating 3*a* is formed at the tip end of the base material 1, and also the hard particles H are fixed to the bond coating 3*a* in a state in which some of the hard particles H protrude partially. Finally, as in the case of the first embodiment, heating treatment is accomplished for the diffusion between the brazing filler metal, MCrAlY, and the Ni coating NC. Thereby, firm bonding due to mutual diffusion takes place, and hence an abrasion-resistant coating 3 having a high oxidation resistance is formed. The operation and effects of this embodiment is almost the same as those of the first embodiment.

Figure 3:
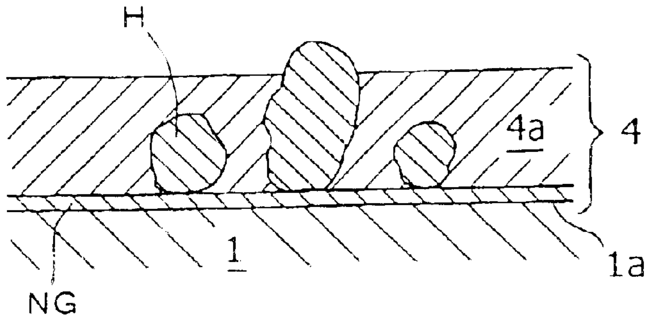
FIG. 3 is a sectional view of a base material and a coating layer showing a third embodiment of an abrasion-resistant coating and a method for applying the abrasion-resistant coating in accordance with the present invention.

Next, a third embodiment of the present invention will be described with reference to FIG. 3.

Unlike the configurations of the first and second embodiments, the hard particles H are temporarily fixed to the tip end 1*a* of the base material 1 by a Ni plating layer NG in advance. Then, as a material for a bond coating 4*a,* a liquid mixture in which the brazing filler metal and a liquid binder which evaporates when MCrAlY is heated are blended is applied by a brush or the like or poured onto the tip end portion of the base material 1.

The subsequent procedure is almost the same as that of the first or second embodiment, and by that procedure, an abrasion-resistant coating 4 having a high oxidation resistance is formed on the base material 1.

The following is a description of the operation of the abrasion-resistant coating 4. Since the hard particles H are firmly fixed to the base material 1 via the Ni plating layer NG, although the process is somewhat complicated and the cost is high, the dispersion of the hard particles H can be controlled freely, and the amount of coming-off particles decreases as compared with the first embodiment, so that the grindability and durability are further improved.

Figure 4:
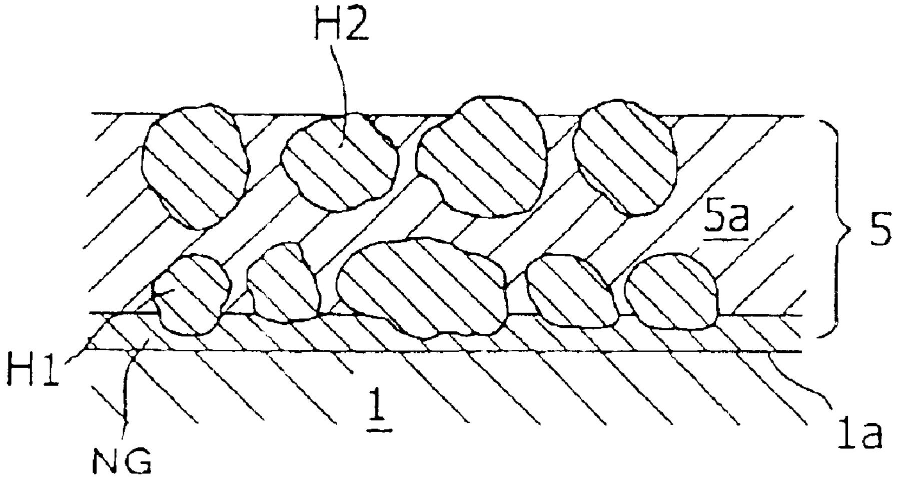
FIG. 4 is a sectional view of a base material and a coating layer showing a fourth embodiment of an abrasion-resistant coating and a method for applying the abrasion-resistant coating in accordance with the present invention.

Next, a fourth embodiment of the present invention will be described with reference to FIG. 4.

First hard particles H1 having a high oxidation resistance (for example, $Al_2O_3$, SiC, and sintered diamond which have high heat resistance) are temporarily fixed to the tip end 1*a* of the base material 1 by the Ni plating layer NG in advance. Then, a liquid mixture in which the brazing filler metal, the liquid binder which evaporates when MCrAlY is heated, and second hard particles H2 having a very high hardness (for example, CBN having a very high hardness of Vickers hardness of 1000 or higher, preferably 5000 or higher) are blended is applied by a brush or the like or poured onto the Ni plating layer NG.

The subsequent procedure is almost the same as that of any one of the first to third embodiments. The Ni plating layer NG and a bond coating 5*a* are dispersed substantially in two layers, upper and lower, and thus an abrasion-resistant coating 5 having high oxidation resistance and durability, which consists of two types of hard particles H1 and H2 having different hardness and oxidation resistance, is formed.

The following is a description of the operation of the abrasion-resistant coating 5. At the first stage of operation, the second hard particles H2 having high hardness function as an abrasive material, and after the long-term operation, the second hard particles H2 separate and come off. In the subsequent operation, the first hard particles H1 having a remarkably high oxidation resistance can function as an abrasive material. Moreover, since the hard particles H1 are fixed to the Ni plating layer NG, hard particles having relatively small specific gravity can be prevented from floating, so that the grindability is maintained for a long period of time, and hence the durability increases remarkably.

Figure 5:
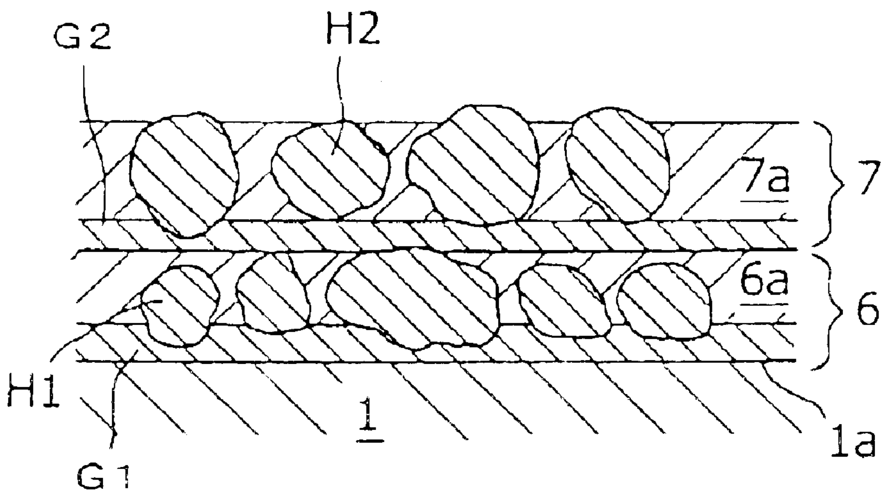
FIG. 5 is a sectional view of a base material and a coating layer showing a fifth embodiment of an abrasion-resistant coating and a method for applying the abrasion-resistant coating in accordance with the present invention.

Next, a fifth embodiment of the present invention will be described with reference to FIG. 5.

The abrasion-resistant coating of the fourth embodiment consists of one layer in which the hard particles H1 and H2 having different grindability and oxidation resistance exist mixedly, except the Ni-plating layer NG. In contrast, in the fifth embodiment, abrasion-resistant coatings 6 and 7 of two layers in which the hard particles H1 and H2 are embedded in separate bond coatings 6*a* and 7*a,* respectively, are combined. The abrasion-resistant coatings 6 and 7 are formed as described below.

First, for the first-layer abrasion-resistant coating 6, the first hard particles H1 are temporarily fixed to the tip end 1*a* of the base material 1 by a first plating layer G1 consisting of Ni, Cr, etc. in advance. Then, as a material for a bond coating 6*a* which has a high oxidation resistance and is capable of withstanding a temperature of 1000° C. and higher, a liquid mixture in which the brazing filler metal and the liquid binder which evaporates when MCrAlY is heated are blended is applied by a brush or the like or poured onto the tip end portion of the base material 1.

The subsequent procedure is almost the same as that of the above-described embodiments, and by that procedure, the first-layer abrasion-resistant coating 6 having an especially high oxidation resistance is formed.

Further, the second hard particles H2 are temporarily fixed onto the top surface of the first-layer abrasion-resistant coating 6 by a second plating layer G2 consisting of Ni, Cr, etc. in advance. Then, as a material for a bond coating 7*a* having a high oxidation resistance, the liquid mixture in which the brazing filler metal and the liquid binder which evaporates when MCrAlY is heated are blended is applied by a brush or the like or poured onto the second plating layer G2 to which the second hard particles H2 are temporarily fixed. This procedure is almost the same as that of the above-described embodiments, and by that procedure, the second-layer abrasion-resistant coating 7 having high oxidation resistance is formed.

The following is a description of the abrasion-resistant coatings 6 and 7. As in the case of the fourth embodiment, since the hard particles H2 are firmly fixed to the base material 1 via the second plating layer G2, although the process is somewhat complicated and the cost is high, the dispersion of the hard particles H1 and H2 can be controlled freely, and in particular, the coming-off amount of the hard particles H2 decreases as compared with the fourth embodiment, so that the durability is improved.

INDUSTRIAL APPLICABILITY

The abrasion-resistant coating and the method for applying the abrasion-resistant coating in accordance with the present invention consist of the bond coating formed on the surface of metallic base material by melting of the mixture containing the brazing filler metal and MCrAlY and the hard particles dispersed and fixed in the bond coating so that some of them are partially protruded from the surface. Therefore, the equipment and operation for applying the abrasion-resistant coating is simple, and the raw material applied to the base material is used effectively for the formation of the coating layer, so that the amount of raw material can be reduced, and the work time can be shortened.

Also, in the above-described invention, by forming a plurality of layers in which a plurality of kinds of hard particles having different hardness and oxidation resistance are dispersed separately, even if the hard particles contained in the upper layer of the plural layers disappear, the hard particles contained in the lower layer can cut the object to be cut.

What is claimed is:

1. An abrasion-resistant coating, comprising: a coating layer formed on the surface of a metallic base material by melting of a mixture containing a Ni-base brazing filler metal and M—Cr—Al—Y, and hard particles dispersed and fixed in said coating layer, wherein some of the hard particles are partially protruded from the surface of said coating layer.

2. The abrasion-resistant coating according to claim 1, wherein a metal coating for improving wettability relative to the Ni-base brazing filler metal is formed on the surface of said hard particle.

3. An abrasion-resistant coating, comprising: hard particles fixed to a metal plating layer provided on the surface of a metallic base material and a coating formed on the surface of said metallic base material by melting of a mixture containing a Ni-base brazing filler metal and M—Cr—Al—Y so that some of said hard particles are partially protruded from the surface of said coating.

4. The abrasion-resistant coating according to claim 1, wherein a plurality of coating layers in which a plurality of kinds of hard particles having different hardness and oxidation resistance are dispersed separately are formed.

5. The abrasion-resistant coating according to claim 4, wherein a metal plating layer for fixing said hard particles is formed in each layer of said plural coating layers.

6. A method for applying an abrasion-resistant coating, comprising:

applying a liquid substance containing metal coated hard particles, a Ni-base brazing filler metal, M—Cr—Al—Y, and a liquid binder which evaporates at the time of heating to the surface of a metallic base material; and heating said applied liquid substance locally to a brazing temperature under high vacuum to evaporate the binder and to melt the Ni-base brazing filler metal and M—Cr—Al—Y.

7. A method for applying an abrasion-resistant coating, comprising:

affixing a sheet comprising a plastic mixture containing a Ni-base brazing filler metal, M—Cr—Al—Y, and a binder which evaporates at the time of heating to the surface of a metallic base material;

applying a liquid mixture consisting of hard particles and said binder to said affixed sheet; and heating said affixed sheet and applied liquid mixture to a brazing temperature under high vacuum to evaporate the binder and to melt the Ni-base brazing filler metal and M—Cr—Al—Y.

8. A method for applying an abrasion-resistant coating, comprising:

forming a metal plating layer on a metallic base material and temporarily fixing hard particles to said plating layer;

pouring a liquid mixture containing a Ni-base brazing filler metal, M—Cr—Al—Y, and a liquid binder which evaporates at the time of heating onto said metal plating layer; and heating said poured liquid mixture to a brazing temperature under high vacuum to evaporate the binder and to melt the Ni-base brazing filler metal and M—Cr—Al—Y.

9. The method for applying an abrasion-resistant coating according to claim 6, wherein a plurality of coating layers in which a plurality of kinds of hard particles having different hardness and oxidation resistance are dispersed separately are formed successively.

10. The method for applying an abrasion-resistant coating according to claim 9, wherein in each layer of said plural coating layers, a metal plating layer for fixing the hard particles dispersed in said layer is formed.

11. The abrasion-resistant coating according to claim 2, wherein a plurality of coating layers in which a plurality of kinds of hard particles having different hardness and oxidation resistance are dispersed separately are formed.

12. The abrasion-resistant coating according to claim 11, wherein a metal plating layer for fixing said hard particles is formed in each layer of said plural coating layers.

13. The abrasion-resistant coating according to claim 3, wherein a plurality of coating layers in which a plurality of kinds of hard particles having different hardness and oxidation resistance are dispersed separately are formed.

14. The abrasion-resistant coating according to claim 13, wherein a metal plating layer for fixing said hard particles is formed in each layer of said plural coating layers.

15. The method for applying an abrasion-resistant coating according to claim 7, wherein a plurality of coating layers in which a plurality of kinds of hard particles having different hardness and oxidation resistance are dispersed separately are formed successively.

16. The method for applying an abrasion-resistant coating according to claim 15, wherein in each layer of said plural coating layers, a metal plating layer for fixing the hard particles dispersed in said layer is formed.

17. The method for applying an abrasion-resistant coating according to claim 8, wherein a plurality of coating layers in which a plurality of kinds of hard particles having different hardness and oxidation resistance are dispersed separately are formed successively.

18. The method for applying an abrasion-resistant coating according to claim 17, wherein in each layer of said plural coating layers, a metal plating layer for fixing the hard particles dispersed in said layer is formed.

* * * * *